United States Patent [19]
Oliveira Da Cunha Lima

[11] Patent Number: 5,677,354

[45] Date of Patent: Oct. 14, 1997

[54] PROCESS FOR RECLAIMING CURED OR SEMI-CURED RUBBER

[76] Inventor: Luiz Carlos Oliveira Da Cunha Lima, Rua Pacheco Leao 606, Casa 107, Jardimbotanico-22460-Rio De Janeiro, Brazil

[21] Appl. No.: 608,935

[22] Filed: Feb. 29, 1996

Related U.S. Application Data

[63] Continuation of Ser. No. 185,546, Jan. 21, 1994, abandoned.

[30] Foreign Application Priority Data

Jan. 22, 1993 [BR] Brazil ..................... 9300252

[51] Int. Cl.$^6$ ..................... C08J 11/04; C08K 3/08
[52] U.S. Cl. ..................... 521/41; 521/41.5; 521/42; 521/43; 521/413; 525/240; 525/370; 525/938
[58] Field of Search ..................... 521/41, 41.5, 42, 521/43; 525/370, 938, 240; 524/413

[56] References Cited

U.S. PATENT DOCUMENTS

| | | | |
|---|---|---|---|
| 4,098,737 | 7/1978 | Lee et al. | 521/44 |
| 4,156,508 | 5/1979 | Kisielewski | 241/80 |
| 4,161,464 | 7/1979 | Nicholas | 521/41.5 |
| 5,304,576 | 4/1994 | Martinez | 521/44.5 |
| 5,359,007 | 10/1994 | Oliveira Da Cunha Lima | 525/232 |

*Primary Examiner*—Paul R. Michl
*Assistant Examiner*—Olga Asinovsky
*Attorney, Agent, or Firm*—Cushman Darby & Cushman IP Group of Pillsbury Madison & Sutro LLP

[57] ABSTRACT

A process for reclaiming cured or semi-cured rubber, by subjecting a mass of rubber to be reclaimed to a solvent effective to swell said mass, passing the formed swollen mass of rubber through restriction means having small openings, such as a perforated plate, deleterious or devulcanizing substances being comprised in at least one of said restriction means and said swollen mass of rubber.

22 Claims, 1 Drawing Sheet

PROCESS FOR RECLAIMING CURED OR SEMI-CURED RUBBER

This is a continuation of application Ser. No. 08/185,546, filed on Jan. 21, 1994 now abandoned.

BACKGROUND OF THE INVENTION

1. Field of the Invention

The invention relates to a process for reclaiming cured or semi-cured rubber and to rubber reclaimed by said process.

It is important in industry to reduce costs, increase efficiency, use less expensive raw materials and add value to by-products. The trend in the rubber reclaiming industry is to find methods which produce a useful formulation at a lower cost and with a better quality. Certainly, as close as these methods come to the composition of origin the better such reclaiming will be deemed.

2. Description of the Related Art

Brazilian patent specification PI 8500981 discloses a process for regenerating vulcanized rubber using the combined action of a solvent which swells the rubber and a material which is deleterious or devulcanizing. Deleterious materials described include copper, manganese, iron, chrome, nickel and cobalt, and their alloys and derivatives. These metals may be a part of the milling material. Devulcanizing agents disclosed include derivatives of guanidine, hydrazine and phenylamine. It describes the employment of mills in which the deleterious action of certain chemical materials are applied at the same time in which the particles are reduced. This process resulted in obtaining a better quality reclaim at a lower cost than the one achieved out of the same composition but reclaimed by the conventional process, in which heating is applied as a reclaiming means (in a digestor or autoclave), along with mechanical refining.

The process of Brazilian PI 8500891 requires a long milling time, typically 8–10 hours.

GB 1334718 discloses a process for pulverizing rubber, which includes subjecting the fragments of this material to a temperature of less than −40° C., by means of cryogenic agents, to facilitate the separation of the rubber from the remaining constituents of the compositions, including the metallic components. After the separation has been made, there is a conventional pulverization process, such as the use of a hammer or other mill. Although the separation of the constituents is thus facilitated, this process has the inconvenience of operating at excessively low temperatures and using a great deal of liquid nitrogen.

In U.S. Pat. No. 2,088,920, a process is described for regenerating rubber, using derivatives of guanidine, which have devulcanizing proteins. For an adequate mixture to be made as between the devulcanizer and the rubber, the latter should be freely divided. However, in this patent, there is no description of the specific pulverization process which should be used.

In U.S. Pat. No. 4,156,508, a mechanical process is described, using pressure and high temperatures and passing through a refiner to reduce and regenerate the particles of vulcanized rubber, giving a regenerated product with a Shore hardness of between 50 and 62.

BR 7606727 describes a process for the recovery and re-use of elastomeric vulcanized material, which involves raising the temperature on the surface of the material to between 2000° and 3000° C. for a brief period of from 1 to 10 seconds.

GB 505156 describes a method for pulverizing remains of vulcanized rubber, such objective being achieved by a continuous process, which basically involves the following steps:

(1) impregnation of the material to be pulverized, with an intumescent agent; and (2) submitting the material to the mechanical action of a mill so as to reduce the residue to a fine powder and separate the other constituents of the composition from the rubber.

In accordance with this patent, any adequate intumescing agents may be used, preferably non-inflammable, chlorated organic solvents.

German 2 815 122 employs swelling to weaken the rubber and thus make easier the removal of fibers and wires that reinforce the rubber articles. The process, however, does not reclaim the rubber; it only reduces particles size to between 0.3 to 0.8 millimeters. The use of the rubber obtained thereby is limited to loading other compositions.

SUMMARY OF THE INVENTION

The present invention pertains to a process of total reclaim of cured or semi-cured rubber, much faster than the process of Brazilian Patent specification PI 8500981. The process of the present invention comprises forming a swollen mass of rubber by subjecting a mass of rubber to be reclaimed to a solvent effective to swell said rubber to be reclaimed, passing the swollen mass of rubber through restriction means having small openings, with deleterious or devulcanizing substances being comprised in at least one of said restriction means and said swollen mass of rubber.

DESCRIPTION OF THE PREFERRED EMBODIMENTS

Figure 1:
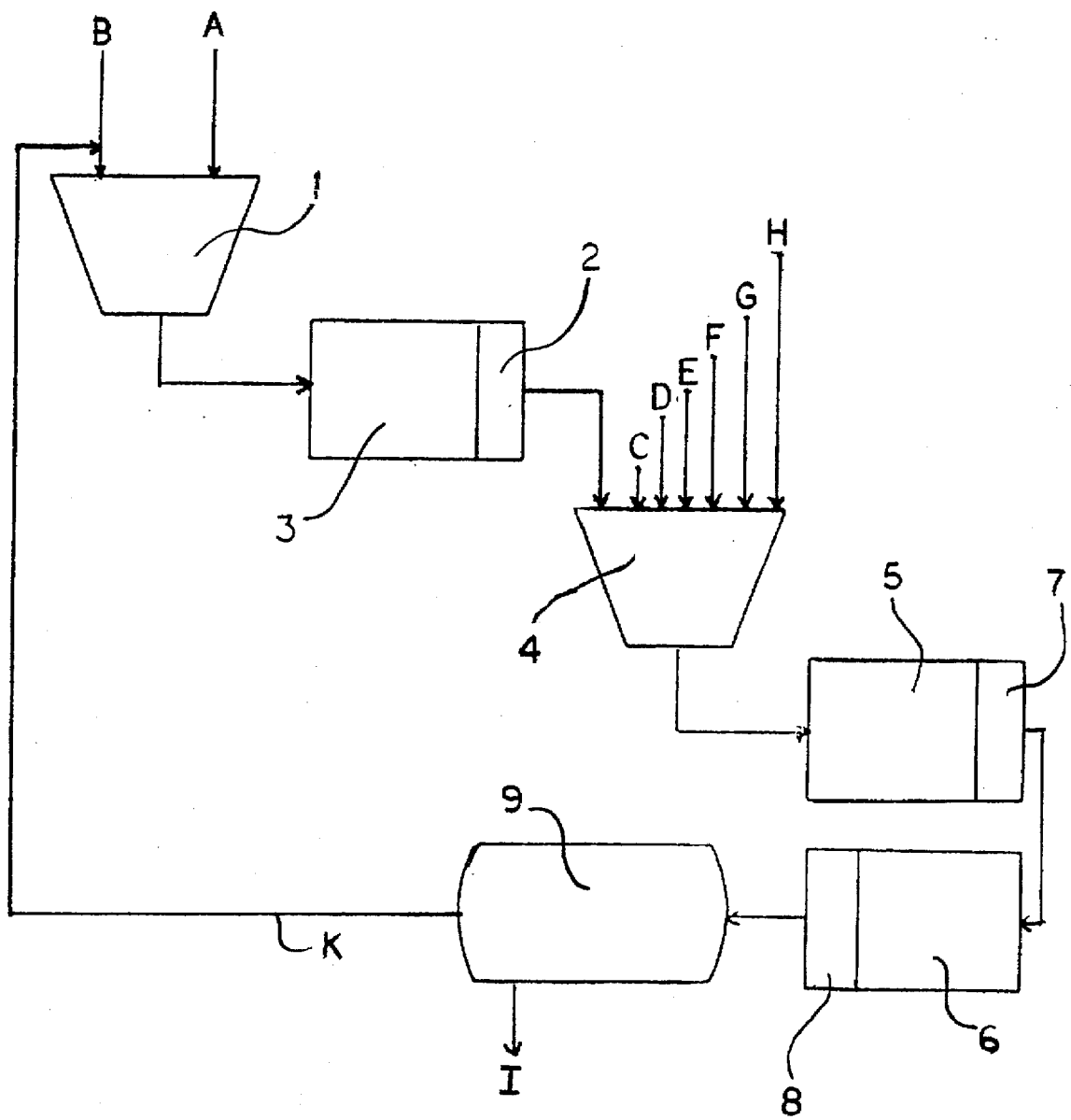
FIG. 1 is a diagrammatic illustration of the process of the present invention.

In the process of the present invention, rubber is passed through restricted openings under pressure and is reduced in size, at the same time in which it contacts deleterious elements. Following its decompression to a lower pressure it suffers a second break by the produced flash, induced by the solvent which swells the rubber particle. If this operation is repeated with more restricted (smaller) openings each repetition, the reclaim becomes better each repetition, more homogeneous and with characteristics closer to the original rubber composition.

The employment of rubber devulcanizing agents and activators of deleterious elements modify the characteristics of the reclaim and speed their actions. Therefore, one applies deleterious or devulcanizing substances. Preferably the deleterious substances are copper, manganese, cobalt, or their alloys or compounds such as salts, e.g. chlorides, acetates, sulphates. Preferably the devulcanzing agents are guanidines and their derivatives such as diphenylguanidine, hydrazines and their derivatives such as phenyl hydrazine, phenyl mines, such as aniline, etc. Other devulcanizing agents often used are the derivatives of fatty acids, mixtures of organo-metallic complexes, halogenated derivatives such as pentachlorothiobenzene, benzoic acid, phthalic anhydride, etc. In this same operation sequence, where the rubber formulation is swollen and broken through restrictions, other products can be added such as plasticizers, resins, loads (fillers), antioxidants, accelerators, curing agents, etc. The product thus obtained in paste or thick oil form is dried in an appropriate drier, the solvent being recovered and capable of being recycled.

Solvents which can be used to cause swelling of cured rubber are:

ETHERS: ethyl ether, isopropyl ether, butyl ether, hexyl ether, dichlorethyl ether, triglycol dicloride, ethylene oxide, propylene oxide, vinyl ethyl ether, vinyl isopropyl ether.

ESTERS: ethyl acetate, isopropyl acetate, butyl acetate, methyl amyl acetate, 2-ethylbutyl acetate, 2-ethylhexyl acetate, methyl acetoacetate, ethyl acetoacetate, amyl acetate.

KETONES: acetone, methyl ethylketone, methyl amyl ketone, diacetone alcohol, diisobutyl ketone, acetyl acetone.

AMINES: phenyl amine, diphenyl amine, butyl amine, dibutyl amine.

CHLORIDES: ethylene dichloride, propylene dicloride, carbon tetrachloride, chloroform, trichlorethane, butyl chloride, vinyl chloride, perchlorethylene.

HYDROCARBONS: benzene, toluene, xyilene, rubber solvent, aromatic oil, naphtenic oil, paraffinic oil.

PINE DERIVATIVES: pine oil, pine tar

It is preferred that the deleterious substances should be provided by being comprised in the restriction means, for example, by use of a perforated plate made or iron-manganese, brass and alloys with copper, manganese or cobalt, or by use of a screen or metallic sponge made of, e.g. copper. This avoids an economic loss from adding agents which are difficult or impossible to recover.

In accordance with the present invention, the step of passing through restriction means can often be done in as little time as 5 seconds to 4 minutes, which contrasts with the 8 to 10 hours typical of the prior art milling.

The restriction means preferably is metallic and may be one or more of perforated plates or plaques, screens, sponges or porous plaques.

The rubber to be reclaimed is any type of vulcanized, semi-vulcanized, cured or semi-cured rubber compositions. In the process of the invention, the swollen rubber mass may be heated or at ambient temperature and may be at a pressure lower or higher than atmospheric. The amounts of deleterious or devulcanizing substances, and the temperatures and pressures used are variable, depending on the rubber composition to be reclaimed. Normally, ambient temperature is used, with enough pressure to force the rubber composition through the restriction means.

The process has the following stages as may be seen in FIG. 1 Cured rubber [A] is swollen with an appropriate solvent [B] in tank [1]. Then it is forced through very fine restriction means such as an iron-manganese plate with bores or openings [2] of 3 millimeters in diameter, with the use of an injector (comprising a piston) [3]. The swollen rubber reduced to small pieces is kept in a tank [4] where other products may be added to form the desired composition, such a plasticizer [C], resins [D], fillers [E], antioxidants [F], accelerators [G], curing agents [H], etc. Thereafter, the composition is passed through other injectors [5], [6], each one with plates having smaller diameters bores or openings [7], [8], until obtaining the desired size. Such size of the grain or dust of solvent swollen rubber is conditional to the desired degree of reclaim. The thinner it becomes a higher degree of reclaim is achieved A. A following stage is to submit the composition to a dryer [9], where the dry rubber is recovered [I] (being named "Relastomer"), and the solvent is recovered [K], and is recycled to the process.

Except for indicated comparative examples, the examples of the present invention used a perforated iron-manganese plate as described above for the restriction means. The formulations are given in parts by weight.

EXAMPLES

Example #1

It was prepared with the following natural rubber formulations:

| | | |
|---|---|---|
| Natural rubber | | 100.00 |
| Zinc oxide | | 5.00 |
| Stearic acid | | 2.00 |
| Carbon Black N-330 | | 45.00 |
| BLE antioxidant (Reaction of diphenylamine with acetone) | | 1.00 |
| Plasticizer (Aromatic oil) | | 4.00 |
| Accelerator (Sulfenamide) | | 0.60 |
| Sulphur | | 2.50 |
| TOTAL | | 160.10 |
| CHARACTERISTICS | | |
| Vulcanizing | 30 min. | 145 C. |
| Tensile strength | kg/cm2 | 285 |
| 300% Modulus | kg/cm2 | 115 |
| Elongation at break | % | 500 |
| Hardness | Shore A | 65 |
| RECLAIMED | | |
| Sample 1: | Reclaim NR pure | |
| Sample 2: | Reclaim NR pure | 100.00 |
| | Accelerator (Sulfenamide) | 0.30 |
| | Sulphur | 1.25 |
| TOTAL | | 101.55 |

| CHARACTERISTICS | | | |
|---|---|---|---|
| Vulcanizing | 30 min. | | at 145 C. |
| | | Sample 1 | Sample 2 |
| Tensile strength | kg/cm2 | 150 | 190 |
| 300% Modulus | kg/cm2 | 95 | 105 |
| Elongation at break | % | 480 | 400 |
| Hardness | Shore A | 65 | 67 |

Example #2

It was prepared with the following acrylonitrile-butadiene NBR rubber formulation:

| | | |
|---|---|---|
| Hycar ® 1042 B. F. Goodrich ® (Acrylonitrile-butadiene rubber) | | 100.00 |
| Zinc oxide | | 5.00 |
| Stearic acid | | 1.50 |
| Carbon black N-550 | | 30.00 |
| Carbon black N-762 | | 40.00 |
| Plasticizer (Tricresyl phosphate) | | 7.00 |
| Plasticizer (Epoxidised castor-oil) | | 8.00 |
| Accelerator (Tetramethylthiuram disulfide) | | 0.60 |
| Sulphur | | 1.00 |
| TOTAL | | 193.10 |
| CHARACTERISTICS | | |
| Vulcanizing | 30 min. | at 155 C. |
| Tensile strength | kg/cm2 | 160 |
| 300% Modulus | kg/cm2 | 150 |
| Elongation at break | % | 330 |
| Hardness | Shore A | 62 |
| RECLAIMED | | |
| Sample 1: | Reclaim NBR pure | |
| Sample 2: | Reclaim NBR pure | 193.00 |
| | Accelerator (Tetramethylthiuram disulfide) | 0.30 |
| | Sulphur | 0.50 |
| TOTAL | | 193.80 |

| CHARACTERISTICS | | | |
|---|---|---|---|
| Vulcanizing | 30 min. | | at 155 C. |
| | | Sample 1 | Sample 2 |
| Tensile strength | kg/cm2 | 80 | 110 |
| 300% Modulus | kg/cm2 | 60 | — |
| Elongation at break | % | 300 | 260 |
| Hardness | Shore A | 62 | 65 |

Example #3

It was prepared with the following polychloroprene CR rubber formulation:

| | |
|---|---|
| Neoprene ® W Dupont ®'s (Polychloroprene) | 100.00 |
| Zinc oxide | 5.00 |
| Magnesium oxide | 4.0 |
| Stearic acid | 1.0 |
| Carbon black N-110 | 30.00 |
| Plasticizer (Naphtenic oil) | 4.00 |
| Coumarone-indene resin | 4.00 |
| Vaseline | 2.0 |
| Antioxidant (Polymerized trimethylquinoline) | 2.0 |
| Accelerator (Tetramethylthiuram disulfide) | 0.60 |
| Accelerator (Diphenylguanidine) | 0.60 |
| Sulphur | 1.00 |
| TOTAL | 154.20 |

| CHARACTERISTICS | | |
|---|---|---|
| Vulcanizing | 30 min. | at 155C. |
| Tensile strength | kg/cm2 | 255 |
| 300% Modulus | kg/cm2 | 110 |
| Elongation at break | % | 520 |
| Hardness | Shore A | 66 |
| RECLAIMED | | |
| Sample 1: | Reclaim CR pure | |
| Sample 2: | Reclaim CR | 154.00 |
| | Accelerator (Tetramethylthiuram disulfide) | 0.30 |
| | Accelerator (Diphenylguanidine) | 0.30 |
| | Sulphur | 0.50 |
| TOTAL | | 155.10 |

| CHARACTERISTICS | | | |
|---|---|---|---|
| Vulcanizing | 30 min. | | at 155C. |
| | | Sample 1 | Sample 2 |
| Tensile strength | kg/cm2 | 150 | 200 |
| 300% Modulus | kg/cm2 | 80 | 140 |
| Elongation at break | % | 500 | 410 |
| Hardness | Shore A | 66 | 68 |

Example #4

It was prepared with the following styrene butadiene rubber SBR rubber formulation:

| | |
|---|---|
| SBR 1502 (styrene butadiene rubber) | 100.00 |
| Zinc oxide | 4.00 |
| Carbon black N-672 | 25.00 |
| Antioxidant (Polymerized trimethylquinoline) | 1.00 |
| Accelerator (Sulfenamide) | 1.80 |
| Accelerator (Tetramethylthiuram disulfide) | 1.30 |
| Accelerator (Tetraethylthiuram disulfide) | 1.30 |
| TOTAL | 134.40 |

| CHARACTERISTICS | | |
|---|---|---|
| Vulcanizing | 20 min. | at 155C. |
| Tensile strength | kg/cm2 | 155 |
| 300% Modulus | kg/cm2 | 39 |
| Elongation at break | % | 700 |
| Hardness | Shore A | 49 |
| RECLAIMED | | |
| Sample 1: | Reclaim SBR pure | |
| Sample 2: | Reclaim SBR | 134.40 |
| | Accelerator (Sulfenamide) | 0.90 |
| | Accelerator (Tetramethylthiuram disulfide) | 0.60 |
| | Accelerator (Tetraethylthiuram disulfide) | 0.60 |
| TOTAL | | 136.50 |

| CHARACTERISTICS | | | |
|---|---|---|---|
| Vulcanizing | 20 min. | | at 155C. |
| | | Sample 1 | Sample 2 |
| Tensile strength | kg/cm2 | 65 | 105 |
| 300% Modulus | kg/cm2 | 15 | 65 |
| Elongation at break | % | 650 | 570 |
| Hardness | Shore A | 49 | 52 |

Example #5

It was prepared with the following isobutylene-isoprene copolymer IIR rubber formulation:

| | |
|---|---|
| Exxon ® Butyl 268 ® (Isobutylene-isoprene copolymer) | 100.00 |
| Zinc oxide | 5.00 |
| Carbon black N-550 | 25.00 |
| Carbon black N-762 | 25.00 |
| Plasticizer (Paraffinic oil) | 10.00 |
| Accelerator (Tetramethylthiuram disulfide) | 1.00 |
| Accelerator (Tetraethylthiuram disulfide) | 0.50 |
| Sulphur | 2.00 |
| TOTAL | 168.50 |

| CHARACTERISTICS | | |
|---|---|---|
| Vulcanizing | 20 min. | 152C. |
| Tensile strength | kg/cm2 | 110.00 |
| 300% Modulus | kg/cm2 | 55.00 |
| Elongation at break | % | 400.00 |
| Hardness | Shore A | 52.00 |
| RECLAIMED | | |
| Sample 1: | Reclaim IIR pure | |
| Sample 2: | Reclaim IIR | 168.50 |
| | Accelerator (Tetramethylthiuram disulfide) | 0.50 |
| | Accelerator (Mercaptobenzothiazole) | 0.25 |
| | Sulphur | 1.00 |
| TOTAL | | 170.25 |

| CHARACTERISTICS | | | |
|---|---|---|---|
| Vulcanizing | 20 min. | | at 152C. |
| | | Sample 1 | Sample 2 |
| Tensile strength | kg/cm2 | 50 | 78 |
| 300% Modulus | kg/cm2 | 20 | 52 |
| Elongation at break | % | 360 | 310 |
| Hardness | Shore A | 52 | 54 |

Example #6

It was prepared with the following polybutadiene rubber (BR) rubber formulation:

| | | |
|---|---|---|
| BR-55 Coperbo ® (Polybutadiene rubber) | | 100.00 |
| Stearic acid | | 2.00 |
| Zinc oxide | | 5.00 |
| Accelerator (Sulfenamide) | | 1.25 |
| Accelerator (Tetramethylthiuram disulfide) | | 0.15 |
| Sulphur | | 10.00 |
| TOTAL | | 118.40 |
| CHARACTERISTICS | | |
| Vulcanizing | 10 min. | at 150C. |
| Hardness | Shore A | 66 |
| Resilience | % | 92 |
| RECLAIMED | | |
| Sample 1: | Reclaim BR pure | |
| Sample 2: | Reclaim BR | 118.40 |
| | Sulfenamide | 0.60 |
| | Accelerator (Tetramethylthiuram disulfide) | 0.10 |
| | Sulphur | 2.00 |
| TOTAL | | 121.10 |

| | | | |
|---|---|---|---|
| CHARACTERISTICS | | | |
| Vulcanizing | 10 min. | | at 150C. |
| | | Sample 1 | Sample 2 |
| Hardness | Shore A | 66 | 68 |
| Resilience | % | 70 | 85 |

Example #7

It was prepared with the following chlorosulfonated polyethylene CSM rubber formulation:

| | | |
|---|---|---|
| HYPALON-40 ® Dupont ®'s (Chlorosulfonated polyethylene) | | 100.00 |
| Litharge | | 20.00 |
| Magnesium carbonate | | 20.00 |
| Carbon black N-762 | | 50.00 |
| Plasticizer (Aromatic oil) | | 10.00 |
| Accelerator (Mercaptobenzothiazole) | | 0.50 |
| Accelerator Dupont ®'s (Thiuram hexasulphide) | | 2.00 |
| TOTAL | | 202.50 |
| CHARACTERISTICS | | |
| Vulcanizing | 30 min. | at 155C. |
| Tensile strength | kg/cm2 | 225 |
| Elongation at break | % | 200 |
| Hardness | Shore A | 73 |
| RECLAIMED | | |
| Sample 1: | Reclaim CMS pure | |
| Sample 2: | Reclaim CMS | 202.50 |
| | Accelerator (Mercaptobenzothiazole) | 0.25 |
| | Accelerator Dupont ®'s (Thiuram hexasulphide) | 1.00 |
| TOTAL | | 203.75 |

| | | | |
|---|---|---|---|
| CHARACTERISTICS | | | |
| Vulcanizing | 30 min. | | at 155C. |
| | | Sample 1 | Sample 2 |
| Tensile strength | kg/cm2 | 140 | 180 |
| Elongation at break | % | 120 | 100 |
| Hardness | Shore A | 73 | 76 |

Example #8

It was prepared with the following fluorelastomer (FMK) rubber formulation:

| | | |
|---|---|---|
| VITON B ® Dupont ®'s (Fluorelastomer) | | 100.00 |
| Litharge | | 15.00 |
| Carbon black N-991 | | 30.00 |
| Vulcanizer (Hexanediamine - Dupont ®'s) | | 3.00 |
| TOTAL | | 148.00 |
| CHARACTERISTICS | | |
| Vulcanizing | 20 min. | at 177C. |
| Heating | 24 hours | 260C. |
| Tensile strength | kg/cm2 | 155 |
| Elongation at break | % | 200 |
| Hardness | Shore A | 78 |
| RECLAIMED | | |
| Sample 1: | Reclaim FMK pure | |
| Sample 2: | Reclaim FMK | 148.00 |
| | Vulcanizer (Hexanediamine - Dupont ®'s) | 1.5 |
| TOTAL | | 149.5 |

| | | | |
|---|---|---|---|
| CHARACTERISTICS | | | |
| Vulcanizing | 20 min. | | at 177C. |
| | | Sample 1 | Sample 2 |
| Tensile strength | kg/cm2 | 80 | 110 |
| Elongation at break | % | 160 | 140 |
| Hardness | Shore A | 78 | 82 |

Example #9

It was prepared with the following propylene-diene terpolymer EPDM rubber formulation:

| | | |
|---|---|---|
| NITRIFLEX ® N-762 (Propylene-diene terpolymer) | | 100.00 |
| Zinc oxide | | 5.00 |
| Stearic acid | | 2.00 |
| Carbon black N-660 | | 80.00 |
| Plasticizer (Paraffinic oil) | | 10.00 |
| Accelerator (Mercaptobenzothiazole disulphide) | | 1.50 |
| Accelerator (Tetramethylthiuram disulfide) | | 0.80 |
| Accelerator (Zinc carbamate) | | 0.80 |
| Sulphur | | 2.00 |
| TOTAL | | 202.10 |
| CHARACTERISTICS | | |
| Vulcanizing | 25 min. | at 170C. |
| Tensile strength | kg/cm2 | 160.00 |
| 300% Modulus | kg/cm2 | 80.00 |
| Elongation at break | % | 350.00 |
| Hardness | Shore A | 73.00 |
| RECLAIMED | | |
| Sample 1: | Reclaim EPDM pure | |
| Sample 2: | Reclaim EPDM | 232.90 |
| | Accelerator (Mercaptobenzothiazole disulphide) | 0.70 |
| | Accelerator (Tetramethylthiuram disulfide) | 0.40 |
| | Accelerator (Zinc carbamate) | 0.40 |
| | Sulphur | 1.00 |
| TOTAL | | 235.40 |

| | | | |
|---|---|---|---|
| CHARACTERISTICS | | | |
| Vulcanizing | 25 min. | | at 170C. |
| | | Sample 1 | Sample 2 |
| Tensile strength | kg/cm2 | 60.00 | 100.00 |
| 300% Modulus | kg/cm2 | 35.00 | 60.00 |
| Elongation at break | % | 340.00 | 300.00 |
| Hardness | Shore A | 73.00 | 76.00 |

A basic composition was prepared as starting point for a comparison among the reclaim processes:

1. Basic composition;
2. Reclaim A—reclaim under a slurry mean for reducing particles by means of milling, Patent [PI] BR-8500981;
3. Reclaim—using autoclave and refiner under a dry process;
4. Reclaim B—reclaim under a slurry mean for reducing particles by means of their passing through restrictions, as described in this Patent.

1. Basic composition;

| | | |
|---|---|---|
| SBR-1712 (Styrene butadiene rubber) | | 100.00 |
| Carbon Black N-220 | | 27.50 |
| Carbon Black N-336 | | 20.00 |
| Plasticizer (Aromatic oil) | | 4.00 |
| Coumarone-indene resin | | 5.00 |
| Antioxidant (Polymerized trimethylquinoline) | | 1.50 |
| Zinc oxide | | 5.00 |
| Stearic acid | | 1.00 |
| Accelerator (Sulfenamide) | | 1.50 |
| Accelerator (Diphenylguanidine) | | 0.50 |
| Sulphur | | 1.50 |
| TOTAL | | 167.50 |
| CHARACTERISTICS | | |
| Vulcanizing | 45 min | at 150C. |
| Tensile strength | kg/cm2 | 139.30 |
| 300% Modulus | kg/cm2 | 62.10 |
| Elongation at break | % | 540.00 |
| Hardness | Shore A | 58.00 |
| Abrasion | mm3 | 0.26 |

2. Reclaim A

| | | |
|---|---|---|
| SBR-1712 (Styrene butadiene rubber) | | 100.00 |
| Reclaim A | | 63.20 |
| Carbon black N-336 | | 23.10 |
| Carbon black N-220 | | 32.00 |
| Zinc oxide | | 7.10 |
| Stearic acid | | 1.40 |
| Plasticizer (Aromatic oil) | | 5.70 |
| Coumarone-indene resin | | 7.10 |
| Antioxidant (Polymerized trimethylquinoline) | | 2.20 |
| Accelerator (Sulfenamide) | | 2.20 |
| Accelerator (Diphenylguanidine) | | 0.70 |
| Sulphur | | 2.20 |
| TOTAL | | 246.90 |
| CHARACTERISTICS | | |
| Vulcanizing | 45 min | at 150C. |
| Tensile strength | kg/cm2 | 136.80 |
| 300% Modulus | kg/cm2 | 60.60 |
| Elongation at break | % | 500.00 |
| Hardness | Shore A | 58.00 |
| Abrasion | mm3 | 0.29 |

3. Reclaim - Usual Commercial Process

| | | |
|---|---|---|
| SBR-1712 (Styrene butadiene rubber) | | 100.00 |
| Reclaimed rubber | | 63.20 |
| Carbon black N-336 | | 23.10 |
| Carbon black N-220 | | 32.00 |
| Zinc oxide | | 7.10 |
| Stearic acid | | 1.40 |
| Plasticizer (Aromatic oil) | | 5.70 |
| Coumarone-indene resin | | 7.10 |
| Accelerator (Sulfenamide) | | 2.20 |
| Sulphur | | 2.20 |
| TOTAL | | 244.00 |
| CHARACTERISTICS | | |
| Vulcanizing | 45 min | at 150C. |
| Tensile strength | kg/cm2 | 118.40 |
| 300% Modulus | kg/cm2 | 54.20 |
| Elongation at break | % | 520.00 |
| Hardness | Shore A | 58.00 |
| Wear | mm3 | 0.34 |

4. Reclaim B - A New Process

| | | |
|---|---|---|
| SBR-1712 (Styrene butadiene rubber) | | 100.00 |
| Reclaim B | | 63.00 |
| Carbon black N-336 | | 23.10 |
| Carbon black N-220 | | 32.00 |
| Zinc oxide | | 7.10 |
| Stearic acid | | 1.40 |
| Plasticizer (Aromatic oil) | | 5.70 |
| Coumarone-indene resin | | 7.10 |
| Antioxidant (Polymerized trimethylquinoline) | | 2.20 |
| Accelerator (Sulfenamide) | | 2.20 |
| Accelerator (Diphenylguanidine) | | 0.70 |
| Sulphur | | 2.20 |
| TOTAL | | 246.70 |
| CHARACTERISTICS | | |
| Vulcanizing | 45 min | at 150C. |
| Tensile strength | kg/cm2 | 135.00 |
| 300% Modulus | kg/cm2 | 62.00 |
| Elongation at break | % | 450.00 |
| Hardness | Shore A | 58.00 |
| Abrasion | mm3 | 0.30 |

I claim:

1. A process for reclaiming cured or semi-cured rubber, which comprises forming a swollen mass of rubber by subjecting a mass of rubber to be reclaimed to a solvent effective to swell said rubber to be reclaimed, forcing the swollen mass of rubber through restriction means having openings, said restriction means being selected from the group consisting of perforated plates of plaques, screens, sponges and porous plaques, with deleterious substances being comprised in at least one of said restriction means, thereby forming finely divided pieces of reclaimed rubber.

2. The process according to claim 1, wherein said restriction means is at least one member selected from the group consisting of perforated plates or plaques, screens, sponges and porous plaques.

3. The process according to claim 1, wherein the rubber to be reclaimed is any type of vulcanized, semi-vulcanized, cured, or semi-cured rubber composition.

4. The process according to claim 1, wherein the swollen rubber mass is heated.

5. Process according to claim 1, wherein swollen rubber mass is at ambient temperature.

6. The process according to claim 1, further comprising forcing said formed finely divided pieces of swollen rubber through at least one further of said restriction means, said at least one further of said restriction means having smaller openings than the openings of the immediately previous employed restriction means.

7. The process according to claim 1, wherein said deleterious substances are selected from the group consisting of copper, manganese and cobalt and alloys and compounds thereof.

8. The process according to claim 1, wherein devulcanizing agents are added to said swollen rubber, said devulcanizing agents being selected from the group consisting of halogenated derivatives, organo-metallic complexes, acids, guanidines, hydrazines, phenyl amines, and derivatives and mixtures thereof.

9. The process according to claim 7, wherein said restriction means comprises at least one of said deleterious substances.

10. The process according to claim 9, wherein said restriction means is metallic.

11. The process according to claim 9, wherein said restriction means is a perforated plate made of manganese, iron-manganese steel-manganese or manganese alloys.

12. The process according to claim 9, wherein said restriction means is a perforated plate made of copper, brass or copper alloys.

13. The process according to claim 9, wherein said restriction means is a perforated plate made of cobalt or cobalt alloys.

14. The process according to claim 9, wherein said restriction means is a copper, brass, or copper alloys screen.

15. The process according to claim 9, wherein said restriction means is a manganese, iron manganese, steel-manganese or manganese alloys screen.

16. The process according to claim 9, wherein said restriction means is a cobalt or cobalt alloys screen.

17. The process according to claim 1, wherein said swollen mass of rubber is forced through said restriction means in a time of 5 seconds to 4 minutes.

18. The process according to claim 1, wherein said swollen mass of rubber is forced through said restriction means under pressure.

19. The process according to claim 15, wherein said pressure is applied through use of an injector comprising a piston or pump.

20. The process according to claim 1, further comprising adding to said formed finely divided pieces of swollen rubber an additive selected from the group consisting of plasticizers, resins, fillers, antioxidants, accelerators and curing agents, and mixtures thereof.

21. A process for reclaiming cured or semi-cured rubber, comprising the following steps:

mixing said cured or semi-cured rubber with a solvent effective to swell said rubber into a swollen mass;

forcing said swollen mass of rubber through restriction means having openings, said restriction means being selected from the group consisting of perforated plates or plaques, screens, sponges and porous plaques, wherein the composition of one of said restriction means includes, copper, manganese or cobalt, said restriction means thereby forming finely divided pieces of reclaimed rubber.

22. The process according to claim 18 wherein after the rubber is forced through said restriction means under pressure, the resulting finely divided rubber undergoes decompression to a lower pressure causing further breakup of the rubber by the produced expansion of the rubber, induced by the solvent present in the swelled fine rubber pieces.

* * * * *